(12) United States Patent
Fletcher et al.

(10) Patent No.: US 8,723,804 B2
(45) Date of Patent: May 13, 2014

(54) TRANSACTION TERMINAL AND ADAPTOR THEREFOR

(75) Inventors: Donna M. Fletcher, Auburn, NY (US);
Melvin D. McCall, Homer, NY (US);
Timothy R. Fitch, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 2209 days.

(21) Appl. No.: 11/056,473

(22) Filed: Feb. 11, 2005

(65) Prior Publication Data
US 2006/0181515 A1    Aug. 17, 2006

(51) Int. Cl.
*G06F 3/041*    (2006.01)
(52) U.S. Cl.
USPC ............ 345/173; 178/18.01; 178/19.01; 715/865; 705/16

(58) Field of Classification Search
USPC ............ 178/18.01–18.11; 345/173–178; 715/865; 379/368, 433.07; 455/186.2; 705/16; 902/22
See application file for complete search history.

(56) References Cited

U.S. PATENT DOCUMENTS

| | | |
|---|---|---|
| 3,596,389 A | 8/1971 | Drueck, Jr. |
| 3,954,244 A | 5/1976 | Gopstein |
| 4,017,129 A | 4/1977 | Boldt et al. |
| 4,092,527 A * | 5/1978 | Luecke .......... 708/140 |
| 4,126,768 A | 11/1978 | Grenzow |
| 4,141,078 A | 2/1979 | Bridges, Jr. et al. |
| 4,313,035 A | 1/1982 | Jordan et al. |
| 4,403,700 A | 9/1983 | Manlove |
| 4,432,020 A | 2/1984 | Onose et al. |
| 4,471,165 A | 9/1984 | DeFino et al. |
| 4,524,396 A | 6/1985 | Schulz et al. |
| 4,534,562 A | 8/1985 | Cuff et al. |
| 4,630,201 A | 12/1986 | White |
| 4,658,416 A | 4/1987 | Tanaka |
| 4,680,801 A | 7/1987 | Etherington et al. |
| 4,689,478 A | 8/1987 | Hale et al. |
| 4,689,742 A | 8/1987 | Troy et al. |

(Continued)

FOREIGN PATENT DOCUMENTS

| | | |
|---|---|---|
| WO | WO 96/26505 | 8/1996 |
| WO | WO 98/10368 | 3/1998 |

(Continued)

OTHER PUBLICATIONS

U.S. Appl. No. 10/414,385, filed Apr. 15, 2003, Fitch et al.

(Continued)

*Primary Examiner* — Michael Pervan
(74) *Attorney, Agent, or Firm* — Additon, Higgins, Pendleton & Ashe, P.A.

(57) ABSTRACT

A transaction terminal (10) having a touch screen (20) disposed in a recess (30) in the terminal housing (12) includes an adaptor (25) for facilitating use of the touch screen by persons that are vision-impaired, hearing-impaired or dexterity-challenged. The adaptor (25) is selectively positionable in operative engagement with the touch screen (20). The adaptor (25) includes an insert (50) and a keypad (60, 160, 260). The insert (50) is supported on terminal housing (12) with deck (52) disposed over and in spaced relationship to the touch screen. The deck (52) has at least one discrete opening therethrough. The keypad includes at least one key juxtaposed relative to said least one discrete opening in said deck of the insert. Upon depression of the key, contact is made with a selected portion of the touch screen (20).

31 Claims, 7 Drawing Sheets

(56) References Cited

U.S. PATENT DOCUMENTS

| | | | |
|---|---|---|---|
| 4,711,996 A | 12/1987 | Drexler | |
| 4,747,050 A | 5/1988 | Brachtl et al. | |
| 4,775,784 A | 10/1988 | Stark | |
| 4,783,823 A | 11/1988 | Tasaki et al. | |
| 4,791,278 A | 12/1988 | Hudson et al. | |
| 4,839,781 A | 6/1989 | Barnes et al. | |
| 4,858,121 A | 8/1989 | Barber et al. | |
| 4,870,503 A | 9/1989 | Miura | |
| 4,897,865 A | 1/1990 | Canuel | |
| 4,902,079 A | 2/1990 | Kaplan et al. | |
| 4,920,567 A | 4/1990 | Malek | |
| 4,943,868 A | 7/1990 | Yoshinaga et al. | |
| 5,001,612 A | 3/1991 | Odlum | |
| 5,055,660 A | 10/1991 | Bertagna et al. | |
| 5,109,426 A | 4/1992 | Parks | |
| 5,115,888 A | 5/1992 | Schneider | |
| 5,216,517 A | 6/1993 | Kinoshita et al. | |
| 5,223,677 A * | 6/1993 | Kapp et al. | 178/18.03 |
| 5,258,604 A | 11/1993 | Behrens et al. | |
| 5,297,202 A | 3/1994 | Kapp et al. | |
| 5,311,175 A | 5/1994 | Waldman | |
| 5,317,136 A | 5/1994 | Hasegawa et al. | |
| 5,324,922 A | 6/1994 | Roberts | |
| 5,334,821 A | 8/1994 | Campo et al. | |
| 5,347,589 A | 9/1994 | Meeks et al. | |
| 5,353,331 A | 10/1994 | Emery et al. | |
| 5,357,563 A | 10/1994 | Hamilton et al. | |
| 5,362,053 A | 11/1994 | Miller | |
| 5,386,104 A | 1/1995 | Sime | |
| 5,406,619 A | 4/1995 | Akhteruzzaman et al. | |
| 5,448,044 A | 9/1995 | Price et al. | |
| 5,455,861 A | 10/1995 | Faucher et al. | |
| 5,467,403 A | 11/1995 | Fishbine et al. | |
| 5,479,530 A | 12/1995 | Nair et al. | |
| 5,509,083 A | 4/1996 | Abtahi et al. | |
| 5,521,966 A | 5/1996 | Friedes et al. | |
| 5,539,159 A | 7/1996 | Protheroe et al. | |
| 5,559,885 A | 9/1996 | Drexler et al. | |
| 5,561,282 A | 10/1996 | Price et al. | |
| 5,568,357 A | 10/1996 | Kochis et al. | |
| 5,572,573 A * | 11/1996 | Sylvan et al. | 455/556.2 |
| 5,577,118 A | 11/1996 | Sasaki et al. | |
| 5,581,607 A | 12/1996 | Richardson, Jr. et al. | |
| 5,586,166 A | 12/1996 | Turban | |
| 5,625,534 A | 4/1997 | Okaya et al. | |
| 5,638,457 A | 6/1997 | Deaton et al. | |
| 5,640,002 A | 6/1997 | Ruppert et al. | |
| 5,652,806 A | 7/1997 | Friend | |
| 5,657,389 A | 8/1997 | Houvener | |
| 5,659,431 A | 8/1997 | Ackley | |
| 5,661,297 A | 8/1997 | Aleshire et al. | |
| 5,672,850 A | 9/1997 | Liu | |
| 5,672,860 A | 9/1997 | Miller et al. | |
| 5,679,943 A | 10/1997 | Schultz et al. | |
| 5,696,909 A | 12/1997 | Wallner | |
| 5,703,349 A | 12/1997 | Meyerson et al. | |
| 5,714,745 A | 2/1998 | Ju et al. | |
| 5,717,195 A | 2/1998 | Feng et al. | |
| 5,740,232 A | 4/1998 | Pailles et al. | |
| 5,745,705 A | 4/1998 | Iguchi | |
| 5,805,416 A | 9/1998 | Friend et al. | |
| 5,805,807 A | 9/1998 | Hanson et al. | |
| 5,818,023 A | 10/1998 | Meyerson et al. | |
| 5,845,256 A | 12/1998 | Pescitelli et al. | |
| 5,852,288 A | 12/1998 | Nakazawa et al. | |
| 5,864,125 A | 1/1999 | Szabo | |
| 5,878,124 A | 3/1999 | Griesmer et al. | |
| 5,892,824 A | 4/1999 | Beatson et al. | |
| 5,895,902 A | 4/1999 | Ziarno | |
| 5,923,735 A | 7/1999 | Swartz et al. | |
| 5,926,549 A | 7/1999 | Pinkas | |
| 5,933,812 A | 8/1999 | Meyer et al. | |
| 5,936,220 A | 8/1999 | Hoshino et al. | |
| 5,945,975 A | 8/1999 | Lundrigan et al. | |
| 5,949,043 A | 9/1999 | Hayashida | |
| 5,949,378 A | 9/1999 | Coveley | |
| 5,959,281 A | 9/1999 | Domiteaux | |
| 5,969,324 A | 10/1999 | Reber et al. | |
| 5,970,146 A | 10/1999 | McCall et al. | |
| 5,979,764 A | 11/1999 | Swyst et al. | |
| 6,003,008 A | 12/1999 | Postrel et al. | |
| 6,003,762 A | 12/1999 | Hayashida | |
| 6,004,003 A | 12/1999 | Dalton et al. | |
| 6,019,286 A | 2/2000 | Li et al. | |
| 6,064,751 A | 5/2000 | Smithies et al. | |
| 6,065,679 A | 5/2000 | Levie et al. | |
| 6,073,034 A | 6/2000 | Jacobsen et al. | |
| 6,076,731 A | 6/2000 | Terrell | |
| 6,078,848 A | 6/2000 | Bernstein et al. | |
| 6,097,606 A | 8/2000 | Groves et al. | |
| 6,101,483 A | 8/2000 | Petrovich et al. | |
| 6,102,290 A | 8/2000 | Swartz et al. | |
| 6,112,857 A | 9/2000 | Morrison | |
| 6,118,889 A | 9/2000 | Izuno et al. | |
| 6,139,152 A | 10/2000 | Ghahramani | |
| 6,142,369 A | 11/2000 | Jonstromer | |
| 6,149,055 A | 11/2000 | Gatto | |
| 6,155,489 A | 12/2000 | Collins, Jr. et al. | |
| 6,179,206 B1 | 1/2001 | Matsumori | |
| 6,193,152 B1 | 2/2001 | Fernando et al. | |
| 6,199,753 B1 | 3/2001 | Tracy et al. | |
| 6,230,970 B1 | 5/2001 | Walsh et al. | |
| 6,234,389 B1 | 5/2001 | Valliani et al. | |
| 6,243,447 B1 | 6/2001 | Swartz et al. | |
| 6,246,995 B1 | 6/2001 | Walter et al. | |
| 6,247,645 B1 | 6/2001 | Harris et al. | |
| 6,253,998 B1 | 7/2001 | Ziarno | |
| 6,257,487 B1 | 7/2001 | Hayashida | |
| 6,268,788 B1 | 7/2001 | Gray | |
| 6,272,506 B1 | 8/2001 | Bell | |
| 6,279,825 B1 | 8/2001 | Yokoyama | |
| 6,308,893 B1 | 10/2001 | Waxelbaum et al. | |
| 6,311,165 B1 | 10/2001 | Coutts et al. | |
| 6,311,896 B1 | 11/2001 | Mulla et al. | |
| 6,321,981 B1 | 11/2001 | Ray et al. | |
| 6,327,575 B1 | 12/2001 | Katz | |
| 6,330,973 B1 | 12/2001 | Bridgelall et al. | |
| 6,336,900 B1 | 1/2002 | Alleckson et al. | |
| 6,340,115 B1 | 1/2002 | Swartz | |
| 6,357,662 B1 | 3/2002 | Helton et al. | |
| 6,359,603 B1 | 3/2002 | Zwern | |
| 6,384,743 B1 | 5/2002 | Vanderheiden | |
| 6,400,836 B2 | 6/2002 | Senior | |
| 6,415,982 B2 | 7/2002 | Bridgelall et al. | |
| 6,424,949 B1 | 7/2002 | Deaton et al. | |
| 6,431,444 B1 | 8/2002 | Gatto | |
| 6,435,412 B2 | 8/2002 | Tsi et al. | |
| 6,439,345 B1 | 8/2002 | Recktenwald et al. | |
| 6,400,069 B1 | 10/2002 | Berline et al. | |
| 6,460,069 B1 | 10/2002 | Berlin et al. | |
| 6,464,135 B1 | 10/2002 | Cohen et al. | |
| 6,471,125 B1 | 10/2002 | Addy | |
| 6,474,550 B1 | 11/2002 | Caridas | |
| 6,486,862 B1 | 11/2002 | Jacobsen et al. | |
| 6,492,978 B1 | 12/2002 | Selig et al. | |
| 6,501,394 B1 | 12/2002 | Hamilton et al. | |
| 6,512,840 B1 | 1/2003 | Tognazzini | |
| 6,532,152 B1 | 3/2003 | White et al. | |
| 6,539,363 B1 | 3/2003 | Allgeier et al. | |
| 6,550,683 B1 | 4/2003 | Augustine | |
| 6,554,705 B1 | 4/2003 | Cumbers | |
| 6,557,754 B2 | 5/2003 | Gray et al. | |
| 6,572,012 B1 | 6/2003 | Gannon et al. | |
| 7,146,577 B2 * | 12/2006 | Hoffman | 715/865 |
| 7,172,114 B2 | 2/2007 | Fletcher et al. | |
| 7,382,911 B1 | 6/2008 | Meier et al. | |
| 7,403,191 B2 * | 7/2008 | Sinclair | 345/173 |
| 7,466,541 B2 | 12/2008 | Takeda | |
| 7,472,825 B2 | 1/2009 | Fitch et al. | |
| 7,499,284 B2 | 3/2009 | Kawanobe et al. | |
| 7,502,462 B2 * | 3/2009 | Rak et al. | 379/433.07 |
| 2001/0020640 A1 | 9/2001 | Yokochi | |
| 2001/0042005 A1 | 11/2001 | McClure et al. | |
| 2002/0140714 A1 | 10/2002 | Hoffman | |

(56) References Cited

U.S. PATENT DOCUMENTS

| | | |
|---|---|---|
| 2003/0012012 A1 | 1/2003 | Hong |
| 2003/0044000 A1* | 3/2003 | Kfoury et al. ............ 379/433.04 |
| 2003/0132292 A1 | 7/2003 | Gomez et al. |
| 2003/0132293 A1 | 7/2003 | Fitch et al. |
| 2003/0132294 A1 | 7/2003 | Gomez et al. |
| 2003/0132297 A1 | 7/2003 | McCall et al. |
| 2003/0132918 A1 | 7/2003 | Fitch et al. |
| 2003/0135751 A1 | 7/2003 | O'Donnell et al. |
| 2003/0222135 A1 | 12/2003 | Stoutenburg et al. |
| 2003/0223185 A1 | 12/2003 | Doczy et al. |
| 2003/0229793 A1 | 12/2003 | McCall et al. |
| 2004/0019513 A1 | 1/2004 | Colalancia et al. |
| 2004/0210759 A1 | 10/2004 | Fitch et al. |
| 2004/0238632 A1 | 12/2004 | Homewood et al. |
| 2005/0039052 A1 | 2/2005 | O'Donnell et al. |

FOREIGN PATENT DOCUMENTS

| | | |
|---|---|---|
| WO | WO 98/14917 | 4/1998 |
| WO | WO 98/19435 | 5/1998 |
| WO | WO 98/50876 | 11/1998 |
| WO | WO 99/60533 | 11/1999 |
| WO | WO 00/04487 | 1/2000 |
| WO | WO 00/36545 | 6/2000 |
| WO | WO 00/70585 | 11/2000 |
| WO | WO 01/37229 | 5/2001 |
| WO | WO 01/61657 | 8/2001 |
| WO | WO 01/84771 | 11/2001 |

OTHER PUBLICATIONS

U.S. Appl. No. 10/841,957, filed May 7, 2004, O'Donnell et al.
Gosnell, David. Deadlines Loom for Debit Security Credit Card Management. Dec. 2002, vol. 15, Iss. 10, p. 46.
Britt, Phillip. Why Security Encryption Matters to Your Bank Community Banker, Aug. 2002; p. 18.
California Assembly Bill, AB2312, Point-of-Sale Devices, Feb. 19, 2004.

* cited by examiner

TRANSACTION TERMINAL AND ADAPTOR THEREFOR

FIELD OF THE INVENTION

The invention relates generally to electronic display screens including a touch screen region and, more particularly, to a transaction terminal having a touch screen and an adaptor for facilitating the input of information via the touch screen by vision-impaired, hearing-impaired, or dexterity-challenged persons.

BACKGROUND OF THE INVENTION

Electronic display screens having touch screen regions are commonly used in applications wherein a user interfacing with the display screen inputs information by contacting a designated portion of the touch screen. For example, touch screens are commonly used in transaction terminals, such as point-of-sale terminals for processing credit card transactions, automatic teller machines for processing banking transactions, and self-service check out terminals for processing purchase transactions. Typically, virtual buttons are displayed on the touch screen, thereby eliminating the need for a standard keyboard for inputting information. The particular arrangement of virtual buttons displayed on the touch screen may be tailored for any particular application and may vary widely from application to application. The particular arrangement of the virtual buttons is controlled by software stored in a computer associated with the touch screen. Common arrangements of the virtual buttons include the numbers 1 through 0 displayed in the standard three by three over one array, and the numbers 1 through 0 with the * and # keys in the conventional three column by four row array. Virtual buttons are also commonly displayed representing specific input instructions or responses such as, for example, YES, NO, ACCEPT, CANCEL, ENTER, CLEAR, UNDO, EXIT and the like.

To input information via the touch screen, a user interfacing with the display screen, merely selects and depresses the appropriate virtual button or buttons. Upon depressing a virtual button, typically with the tip of one's finger or with a stylus, a signal representing the entry associated with the virtual button depressed is sent to the computer associated with the touch screen. Unfortunately, conventional touch screens are difficult, if not impossible, for vision-impaired individuals to use. Additionally, dexterity-challenged persons, such as those impacted by certain nervous system disorders, and hearing impaired persons often find conventional touch screens difficult to use.

It would be desirable to have a touch screen panel that was accessible not only to fully-sighted individuals, but also more easily accessible to vision-impaired persons. It would also be desirable to have a touch screen panel that would be easier for dextrally challenged persons to use, as well as hearing challenged persons.

SUMMARY OF THE INVENTION

It is an object of one aspect of the invention to provide a transaction terminal that is adapted for use by both vision-impaired persons and fully sighted persons.

It is an object of a further aspect of the invention to provide a transaction terminal that is adapted for use by dexterity-challenged persons.

In one embodiment of the invention, the transaction terminal has a display screen including a touch screen operative to display a plurality of virtual buttons thereon includes an adaptor for guiding vision-impaired persons in use of said touch screen. The adaptor has a deck having an upper surface, a lower surface, and a plurality of discrete openings therethrough. The adaptor is selectively positionable into a first position in which said adaptor is operationally engaged with the touch screen.

The adaptor may include an insert and an associated keypad. The insert includes a deck, the insert being supportable on the terminal housing with said deck disposed over and in spaced relationship to said touch screen. The deck has at least one discrete opening therethrough. The associated keypad has at least one key juxtaposed relative to the at least one discrete opening in the deck of the insert. The at least one key is adapted upon depression to contact a selected portion of the touch screen.

The keypad may be an overlay disposed superadjacent the deck of the insert and having an observe surface marked with a raised indicia indicating a depress zone over the at least one discrete opening in the deck of the insert. The overlay pad may be adhesively mounted to an upper surface of the deck of the insert. The at least one key of said keypad includes a dome-shaped contact on a lower surface of the keypad. The keypad may be an underlay disposed subadjacent the deck of the insert, the underlay pad having a raised key extending upwardly into the at least one discrete opening in the deck of the insert, and may be mounted to a lower surface of the deck of the insert by any suitable means, such as adhesive, screws or using a snap-in approach. Further, the deck of the insert may include a plurality of discrete openings therethrough and the associated keypad may have a plurality of keys having a one-to-one correspondence with the plurality of discrete openings in the deck of the insert.

The insert may include a flanged portion extending outwardly from the deck of the insert for supporting the insert atop the housing. A raised indicia, advantageously in Braille, may be provided in association with the discrete openings through the deck of the insert or the keys of the keypad, the indicia identifying a specific depress zone. The deck of the insert may also include an opening positioned over a portion of the touch screen region of the display screen, the opening not associated with any of the plurality of keys, but providing access to the touch screen for the user to execute operations associated with a transaction, such as signing an electronic capture pad with a stylus. The transaction terminal may also be provided with a switch element with at least two switching states, including a first switching state when the insert is operationally engaged with the touch screen region of the display screen and a second switching state when the insert is not operationally engaged with the touch screen region of the display screen. Each switching state may activate a corresponding virtual display on the touch screen region of the display screen.

In a further embodiment, the transaction terminal includes a display screen having a touch screen disposed within a recess in the terminal housing and an adaptor including an insert having a deck having at least one discrete opening therethrough. The insert is supported on the terminal housing with the deck disposed in the recess over and in spaced relationship to the touch screen. A depressible contact is disposed in juxtaposition with the at least one discrete opening in the insert. The depressible contact is adapted to move under a depression force into contact the selected portion of the touch screen region of the display screen. The depressible contact may comprise a contact button disposed within the at least one discrete opening connected by a spring arm to a portion of the deck bounding the at least one discrete opening through the deck of the insert. An overlay panel disposed atop the insert, the overlay panel having an observe surface marked with a raised indicia, advantageously in Braille, identifying a specific depress zone associated with the at least one discrete opening in the insert.

In a still further embodiment, the transaction terminal includes a display screen having a touch screen disposed within a recess in the terminal housing, the display screen and an insert supported on the housing. The insert has a deck disposed in the recess operative engagement with the touch screen. The deck has at least one discrete opening therethrough providing access to a selected portion of the touch sensitive screen. The at least one discrete opening in the deck includes a concavely contoured recess, the recess generally conforming to a human finger tip.

In a further aspect of the invention, an insert is provided for use in connection with a transaction terminal having a display screen having a touch screen region. The insert includes a deck adapted to be supported on the terminal over the touch screen region of the display screen. The deck having at least one discrete opening therethrough through which a user may touch a selected portion of the touch screen of the display screen. The at least one discrete opening in the deck of the insert may include a concavely contoured recess, the recess generally conforming to a human finger tip. A raised rim extending upwardly from the deck may be provided extending about the periphery of the at least one discrete opening through the deck. Raised indicia, advantageously in Braille, may be marked on the insert to identify a specific depress zone associated with the at least one discrete opening in the insert.

In a still further aspect of the invention, an adaptor is provided for adapting a display screen having a touch screen region for use by the vision-impaired, the display screen surrounded by a raised frame. The adaptor includes an insert and an overlay disposed atop the insert. The insert is adapted to be supported by the raised frame surrounding the display screen with the insert having deck disposed over the touch screen region of the display screen. The deck has a plurality of discrete openings therethrough providing access to selected portions of the touch screen region. The insert includes an overlay having a plurality of keys displayed on an observe side thereof, the plurality of keys having a one-to-one correspondence with the plurality of discrete openings through the deck, one key being juxtaposed over each of the plurality of discrete openings through the deck. The insert includes a plurality of depressible contact buttons having a one-to-one correspondence with the plurality of discrete openings through the deck, one contact button within each of the plurality of discrete openings, each of the plurality of contact buttons connected by a spring arm to a portion of the deck bounding the respective discrete opening through the deck in which the respective contact button is disposed. Advantageously, the contact buttons and spring arm are molded integrally with the insert. Each of the plurality of contact buttons has a dome-shaped portion on a lower surface thereof. The overlay may be an embossed member having an upper observe side and a lower reverse side, with a plurality of keys being embossed therein on the observe side of the member.

In a further embodiment of the adaptor, the overlay includes a plurality of dome-shaped contacts disposed on the lower reverse side of the member, the plurality of dome-shaped contacts having one-to-one correspondence with the plurality of keys, one dome-shaped contact being juxtaposed with a respective one of the plurality of keys. Each of the dome-shaped contacts extend downwardly through a respective opening in the insert. The overlay may be marked with raised indicia, advantageously in Braille, may be identify a specific key on embossed on the overlay.

DETAILED DESCRIPTION OF THE INVENTION

Figure 1:
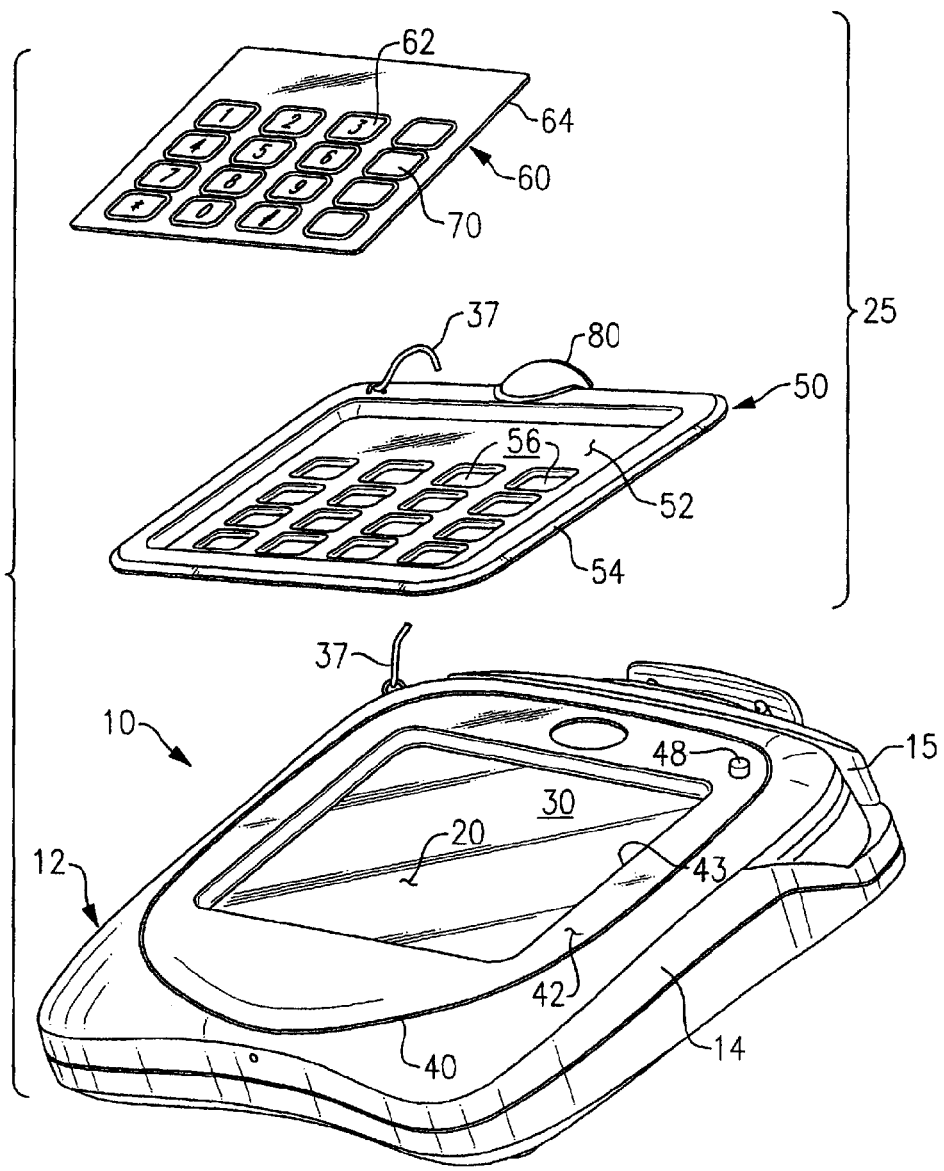
FIG. 1 is an exploded view in perspective illustrating a first embodiment of a transaction terminal embodying the teachings of the present invention.
Figure 2:
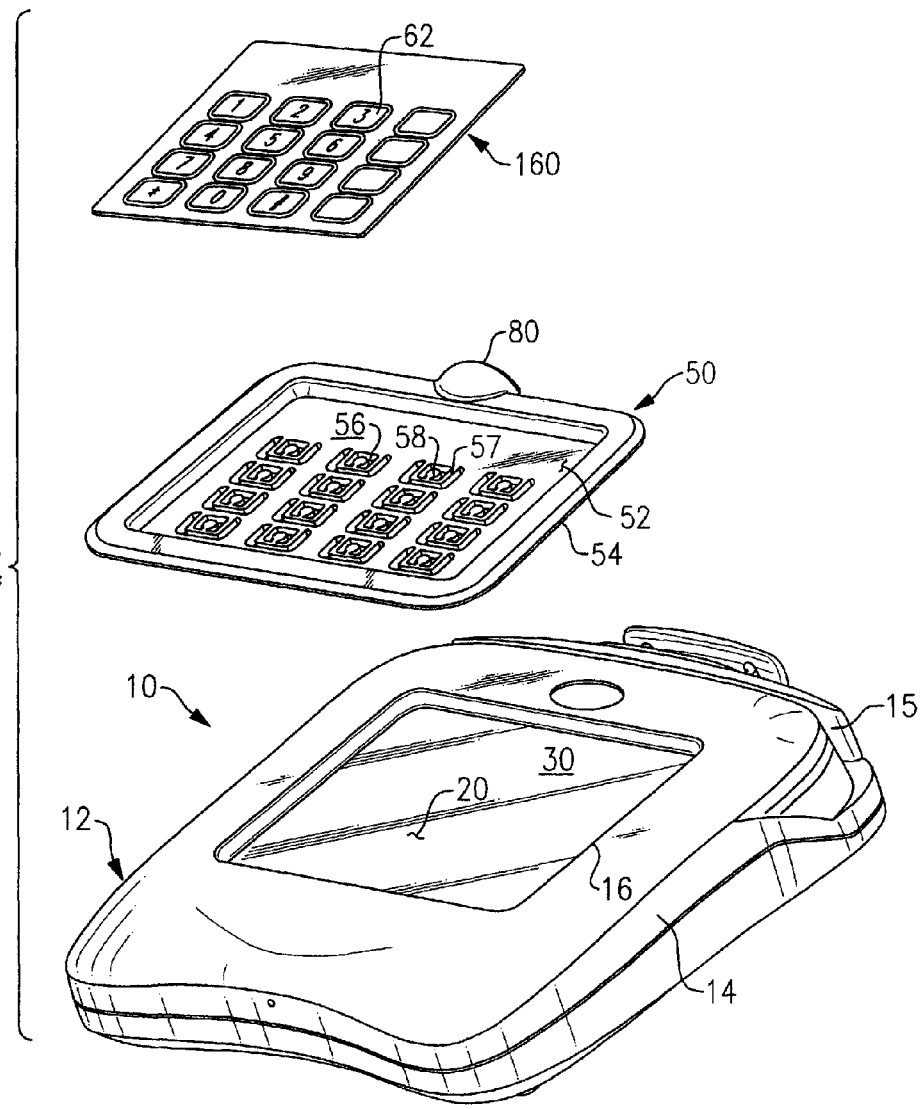
FIG. 2 is an exploded view in perspective illustrating a second embodiment of a transaction terminal embodying the teachings of the present invention.
Figure 3:
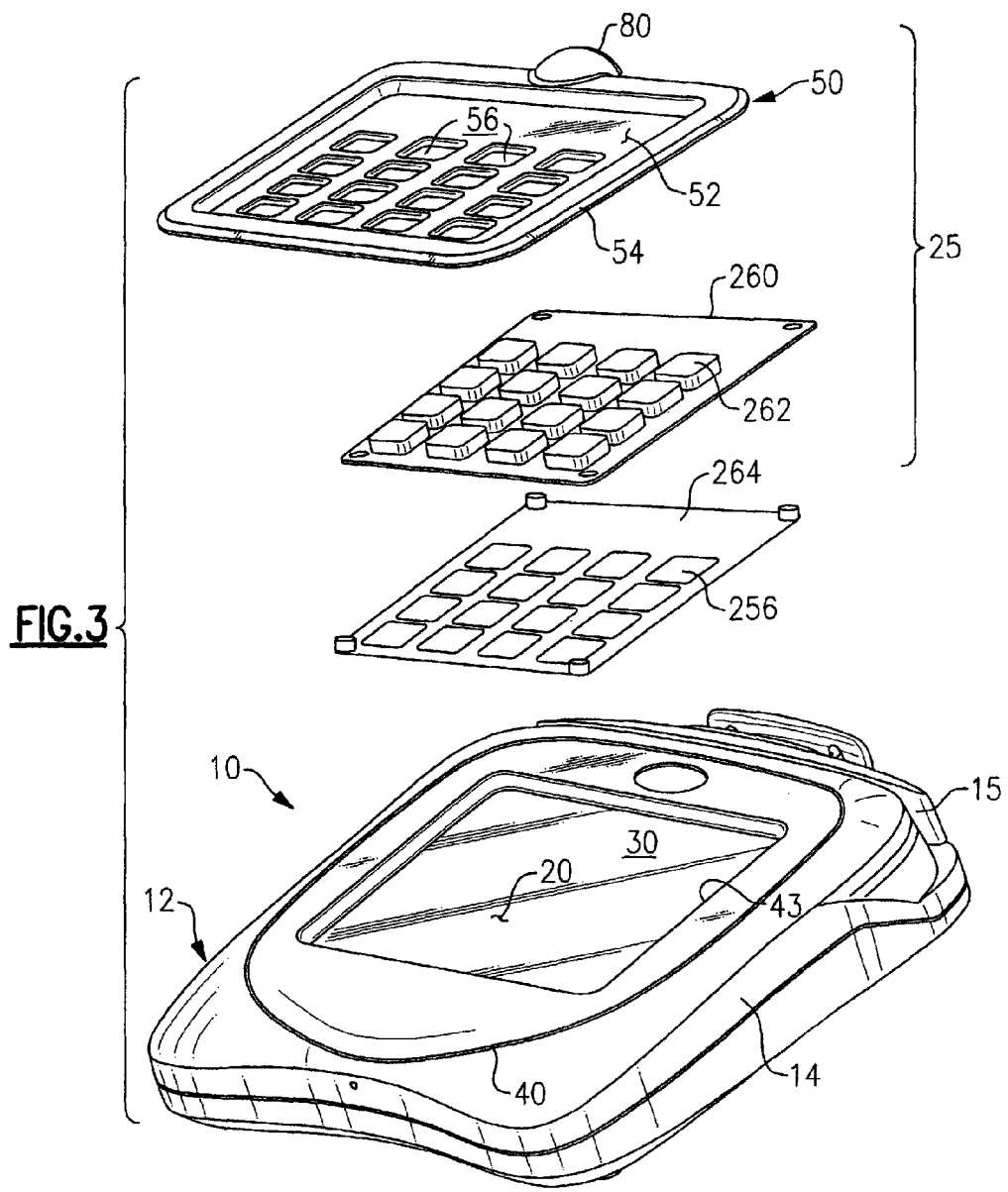
FIG. 3 is an exploded view in perspective illustrating a third embodiment of a transaction terminal embodying the teachings of the present invention.
Figure 10:
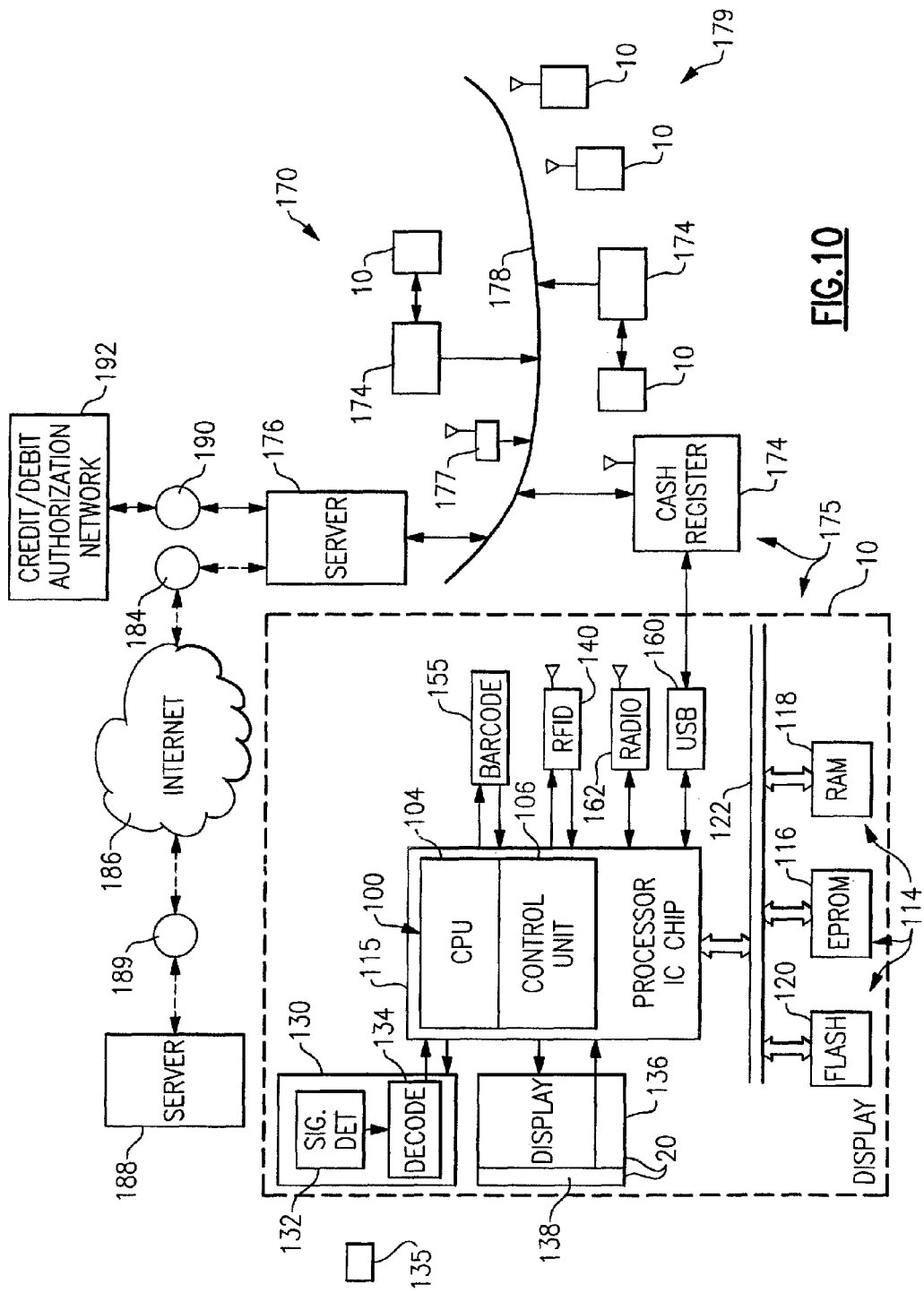
FIG. 10 is a system block diagram illustrating various internal components of transaction terminal.

Referring now to the drawings, there is depicted in FIGS. 1, 2 and 3, a transaction terminal 10, of a type commonly used in processing point-of-sale credit card transactions. The terminal includes a housing 12 having a contact sensitive touch screen 20 disposed in a recess 30 in the upper part 14 of the housing. With reference to FIG. 10, touch screen 20 includes a display 136 and a touch panel 138 disposed over the display, also referred to herein as a display screen. The housing 12 may also optionally include a card reader 15, shown here as a card swipe slot, along one side thereof through which a card, such as for example a credit card or debit card, may be passed so that a card reader unit 130 housed in the housing 12 in operative association with the card reader 15 and control circuit 100 can read data off the card and forward that data to a microprocessor, advantageously also disposed within the terminal housing 12, to complete the transaction. Card reader 15 can be an "insert" style (otherwise termed a "dip" style) card reader. The control circuit 100, through software stored in a memory bank associated with the control circuit 100, also controls the arrangement, number, size and other aspects of virtual buttons that are displayed on the touch screen 20 for any particular transaction or phase of a transaction. The transaction terminal may also have an integrated bar code reader 155 for purposes of reading the bar code enabling price checking of an object in a store and may also contain a wireless communications link for communication with a central processor.

In the embodiment depicted in FIGS. 1 and 3, the housing 12 further includes a removable bezel 40 disposed within the recess 30. The bezel 40 has an outer frame 42 and a central opening 43. The outer frame 42 of the bezel 40 complements the outer geometry of the recess 30 such that when positioned within the recess 30 of the housing 12, the outer frame 42 of the bezel 40 frames the touch screen 20 and the central opening 43 in the bezel 40 overlays the touch screen 20. If desired, a protective screen may be placed beneath the bezel 40 and held in position over the touch screen 20 by the frame 42. A transaction terminal having a removable bezel is disclosed in U.S. patent application Ser. No. 11/027,239, filed Dec. 30, 2004, the entire disclosure of which is hereby incorporated by reference.

Figure 8:
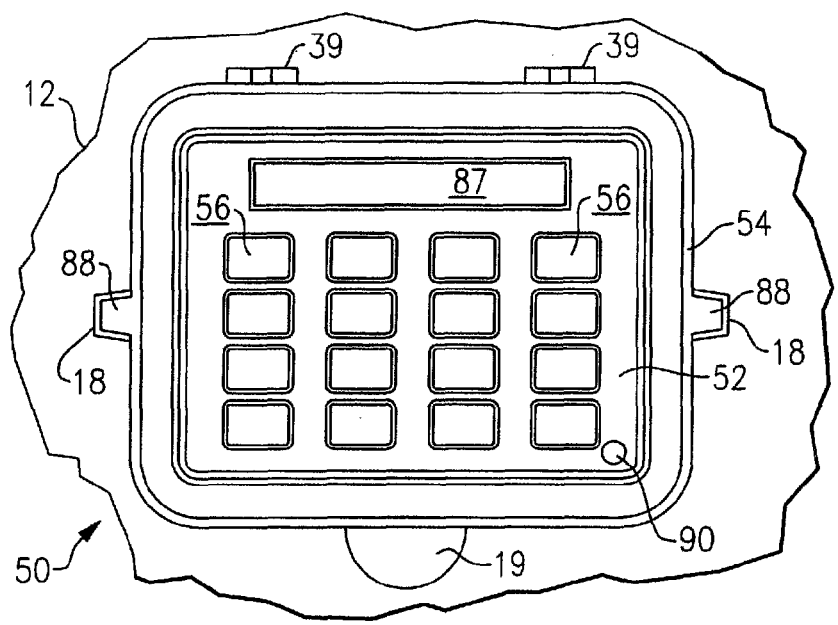
FIG. 8 is a perspective illustration of a still further embodiment of an insert embodying the teachings of the present invention.

Referring again to FIGS. 1, 2 and 3, an adaptor 25 is provided for facilitating use of the touch screen 20 by vision-impaired persons. The adaptor 25 comprises an insert 50 and an associated keypad 60, 160, 260. The insert 50 is adapted for insertion within the recess 30 in the housing 12. The insert 50 has a generally planar deck 52 and a flange 54 that extends around the perimeter of the deck 52. The insert 50 may be molded out of a polycarbonate or other plastic material, either opaque, translucent or transparent, in whole or in part, as desired for a given application. The deck 52 is recessed below the flange 54. In this manner, the flange 54 extends generally upwardly and thence outwardly from the perimeter of the deck 52. The deck 52 has a plurality of discrete openings 56 formed therethrough. The plurality of discrete openings 56 may be arranged in any desired pattern that complements the virtual button arrangement that will be displayed on the touch screen panel for the particular transaction to be carried out via the transaction terminal. The insert 50 may also include one or more additional openings not associated with virtual buttons on the touch screen 20, such as for example an opening 87, as illustrated in FIG. 8, for the user to sign his/her signature on the touch screen 20 with a touch pen.

The insert 50 may include a structural portion designed to facilitate insertion and removal from the recess 30 in the housing 12. The insert of the present invention may include a structural portion designed to facilitate placing the insert onto, and/removing it from, the touch screen. For example, the peripheral portion of the insert 50 may include a projecting portion 80 designed to be readily engageable by a stylus, finger or fingertip, or pair of fingers or fingertips. In the case of a stylus or single finger/fingertip this peripheral portion would be primarily useful in initially lifting or levering ht insert up and away from the touch screen to facilitate grasping and remove, as where one side of the insert is brought up sufficiently to allow a tool or, more typically, finger to be insert into the space thereby created between the insert and the display screen. In the case of a pair of fingers/fingertips, the peripheral portion could be firmly gripped by a pair of fingers/fingertips, and could then be securely held for purposes of either lifting the insert off of the display screen, or lowering it into place over the display screen. The peripheral portion may be, for example, a simple tab-lie projection, rectilinear or rounded, or may be ergonomically shaped for engagement wit a finger or fingertip, as by having a concave surface of a size and shape adapted to receive a finger/fingertip. By making the peripheral portion sufficiently large and/or projecting, it would enable a user to not simply pry or lever up a side of the insert, but to grip the peripheral portion between two fingers and thereby securely hold the insert.

In another embodiment, the insert includes a peripheral portion, which may be the same or different from that describe above, that resists accidental or unintended displacement of the insert from its operational engagement with the display screen. For example, it may be desirable to provide the insert with some resistance to jarring or similar forces that could disrupt the operational engagement between the insert and the touch screen. This could involve providing one or more tab-like projections on a peripheral portion of the insert that would engage corresponding slots in the body of the transaction terminal when the insert is placed into operational engagement with the touch screen. The insert could include a peripheral portion that snaps into or onto a corresponding aperture or fitting in the body of the transaction terminal just as the inset is moved into operational engagement with the touch screen. This could, for example, take the form of a flexible hinge member and aperture, where the action of placing the insert into position over the display screen brings the flexible hinge member into reversible engagement with the aperture. The reversible engagement could be accomplished by configuring the flexible hinge and aperture so that the motion of pushing the insert into operational engagement progressively compresses the flexible hinge until full operational engagement is achieved, at which point the flexible hinge at least partially decompresses and engages a detent or similar releasable holding/locking position. This element could be integral with that provided for placing and/or removing the insert in operational engagement with the touch screen. Alternatively, means for facilitating insertion and removal of the insert 50 may be provided in the housing 12 of the terminal 10, such as for example, a depression in the shoulder 16 of the housing that permits one a insert a finger into the depression and extend beneath the insert 50. Providing such means in the housing rather than the insert per se, provides an esthetic look and improves stackability of the terminals for shipment and storage. To ensure that the insert 50 stays in position when disposed within the recess 30 in the housing 12, the insert 50 may be provided with detent tabs 88, such as illustrated in FIG. 8, for releasably latching the insert 50 into an associated detent receptacle in the housing 12 so that the insert 50 will not fall out of position if the terminal is tipped, dropped or otherwise moved.

While it is contemplated that the inset may be physically discrete from the body of the transaction terminal, and would, for example, be kept in a drawer when not in use, it would be desirable to minimize the risk of loss or damage to the insert by providing some associative element between the insert and the body of the transaction terminal. To this end, the insert 50 may be secured to the terminal 10 to be selectively positionable between a stowed position wherein the insert 50 is not positioned in the recess 30 and an use position wherein the insert 30 is disposed within the recess 30 over the touch screen 20. For example, the insert 50 may be connected to the terminal 10 by a tether 37, as illustrated in FIG. 1, to ensure that the insert 50 is readily available for a individual opting to make use of the insert and to ensure that the insert 50 is not misplaced when not in use. Alternatively, the insert 50 may be attached directly to the housing 12 and be selectively positionable between a stowed position wherein the insert 50 is not positioned in the recess 30 and an use position wherein the insert 50 is disposed within the recess 30. For example, the insert 50 may be mounted by hinges 39 along one side to the housing 12, as illustrated in FIG. 8, so as to be rotatable between a stowed position and a use position. The inset 50 would be movable from a first position in which it is completely disengaged from the display screen and provides access to the display screen, to a second position in which it is in operational engagement with the display screen. In order to prevent or minimize unintentional movement of the insert from the first, completely disengaged position into a position where it interferes with a user trying to sue the display screen, a detent or stop element may be included in the hinge element. This would serve to reversibly lock the insert into the completely disengaged position, so that tipping of the transaction terminal, air movement, or slight accidental contact would not cause it to unintentionally move towards the engaged position.

As a further example, a track may be provided in the housing 12 of the terminal 10 to permit the insert 50 to be inserted into the track and be slid or scrolled into its use position over the touch screen 20 when desired.

Referring now to the embodiment depicted in FIG. 2, when the insert 50 is placed in position on the transaction terminal 10, the flange 54 of the insert 50 rests upon and is supported by the shoulder 16 of the housing 12 framing the touch screen 20. If the housing 12 includes a removable bezel 40, as in the embodiments depicted in FIGS. 1 and 3, the flange 54 of the insert 50 rests upon and is supported by the outer frame 42 of the bezel 40 with the deck 52 of the insert positioned in the central opening 43 of the bezel 40. In either arrangement, the deck 52 of the insert 50 is disposed directly above but spaced slightly from the touch screen panel 20 with the plurality of discrete openings 56 in the deck 52 being aligned directly over the respective virtual button areas on the touch screen 20. It is necessary for the deck 52 of the insert 50 to be spaced from and not contact the touch screen 20 when the insert 50 is disposed within the recess 30 of the housing 12. If the deck of the insert 50 were to contact the touch screen 20, the touch screen would be rendered inoperative.

Referring now to the embodiments depicted in FIGS. 1 and 2, an overlay keypad 60, 160 is provided comprising a generally planar member having a plurality of depressible keys 62 formed therein. The plurality of depressible keys 62 are arranged to complement the plurality of virtual buttons displayed on the touch screen 20, with the plurality of depressible keys 62 being in one-to-one correspondence with the plurality of virtual buttons. The particular arrangement of the plurality of depressible keys 62 on the overlay keypad 60, 160 will be tailored for use in connection with a particular transaction or set of transactions and may vary widely from application to application. As noted previously, the particular arrangement of the virtual buttons is controlled by software stored in the microprocessor associated with the touch screen. The overlay keypad 60 has a perimeter that complements the perimeter of the deck 52 of the insert 50 such that the overlay keypad 60 fits atop the deck 52. The overlay keypad may be secured to the upper surface of the deck 52, for example, by adhesive.

Referring now to the embodiment depicted in FIG. 3, an underlay keypad 260 is provided comprising a generally planar member having a plurality of depressible keys 262 formed therein. In this embodiment, the keypad 260, being an underlay rather than an overlay, is positioned subadjacent the lower surface of the deck 52 of the insert 50 when the insert 50 and keypad 260 are positioned over the touch screen 20. Again, the plurality of keys 262 are arranged to complement the plurality of virtual buttons displayed on the touch screen 20, with the plurality of depressible keys 262 being in one-to-one correspondence with the plurality of virtual buttons. As illustrated in FIG. 3, the plurality of keys 262 are raised keys and will extend upwardly through the plurality of discrete openings in the insert 50 when the keypad 260 is positioned subadjacent the insert 50. The underlay keypad 260 may be a molded member, molded out of a silicone material or other elastomeric material. The underlay keypad 260 may be secured to a relatively rigid retainer 264 as illustrated in FIG. 3 to provide rigidity to the to keypad 260. The retainer 264 is provided with a plurality of holes 256 therethrough corresponding to the plurality of keys in the underlay keypad 260. The particular arrangement of the plurality of depressible keys 262 on the underlay keypad 260 will be tailored for use in connection with a particular transaction or set of transactions and may vary widely from application to application. As noted previously, the particular arrangement of the virtual buttons is controlled by software stored in the microprocessor associated with the touch screen. The underlay keypad 260, and the underlay keypad and the retainer 264 assembly, as applicable, must be spaced from and not contact the touch screen 20 when disposed within the recess 30 of the housing 12. To this end, the underlay keypad 260 or the underlay keypad and retainer assembly may be secured to the insert 50, for example by adhesively adhering to the lower surface of the deck 52 of the insert 50.

Figure 6:
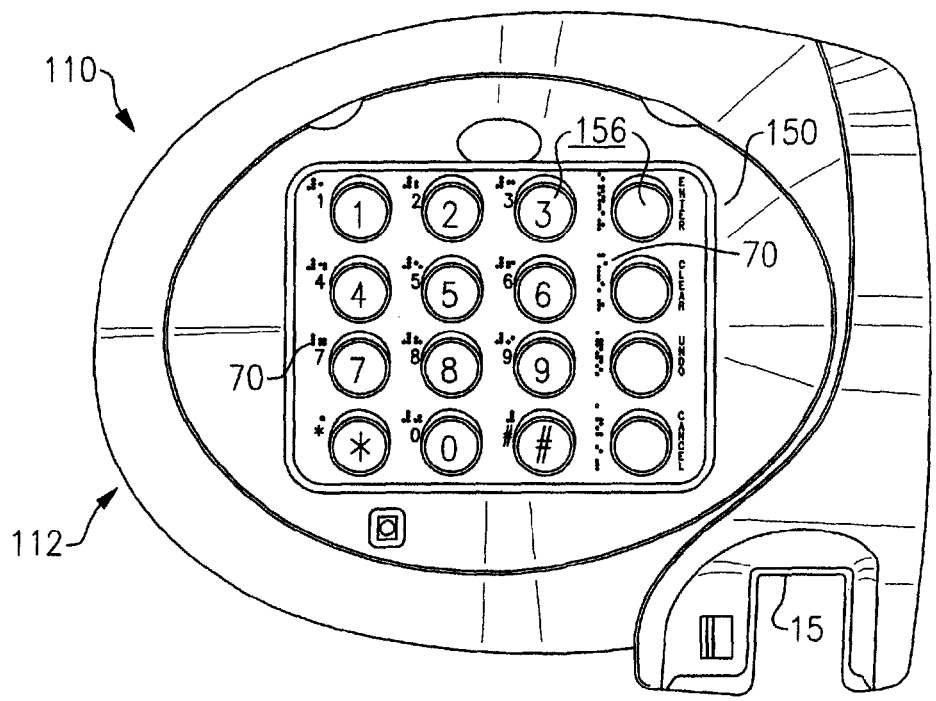
FIG. 6 is a perspective illustration of a further embodiment of a transaction terminal embodying the teachings of the present invention.

Common arrangements of the depressible keys for use in connection with point-of-sale transactions, include the numbers 1 through 0 displayed in the standard three by three over one array, and the numbers 1 through 0 with the * and # keys in the conventional three column by four row array. Additionally, a column of function keys may accompany the array of number/character keys. Advantageously, a column of four function keys may be positioned to the right or the left of the three column by four row array of number/character keys to form a four by four array. The function keys may represent specific input instructions or responses such as, for example, YES, NO, ACCEPT, CANCEL, ENTER, CLEAR, UNDO, EXIT and the like. To facilitate the use of the transaction terminal by vision-impaired individuals, as illustrated in FIG. 6, the keypad may be marked with raised indicia 70, advantageously Braille indicia, labeling the function keys and, if desired, the number keys, either individually or as a set or subset of grouped keys. In addition to or instead of labeling the number keys, as shown in FIG. 4B, a raised nib 55, for example about 15 to about 40 mils, that is about 15 to about 40 thousandths of an inch, in height, and advantageously should conform to any applicable guidelines, laws, or regulations, including but not limited to the Americans with Disabilities Act may be placed on the surface of the "5" key, which is the center in the standard three by three array of the "1" through "9" keys, to assist vision-impaired persons in locating the correct numbers when inputting data such as a personal identification number.

Figure 4A:
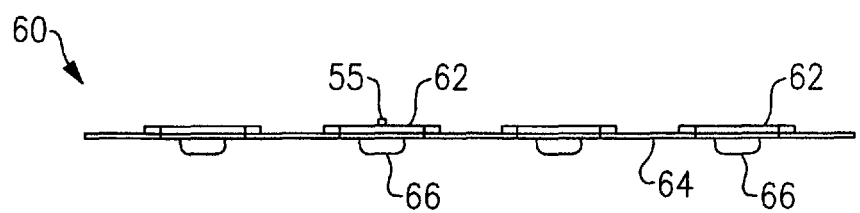
FIG. 4A is a sectional elevation view of an embodiment of an overlay keypad taken along line 4-4 of FIG. 1.
Figure 4B:
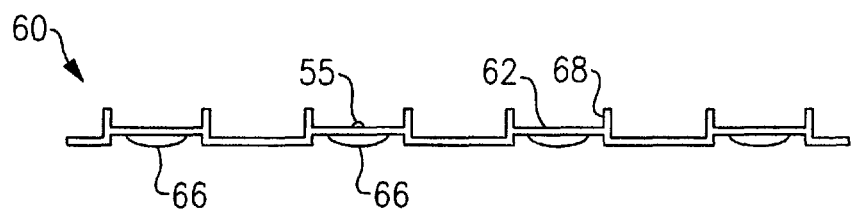
FIG. 4B is a sectional elevation view of an alternate embodiment of an overlay keypad taken along line 4-4 of FIG. 1.

Referring now to FIGS. 1 and 4, the overlay keypad 60 may comprise a relatively thin member 64, for example about 15 mils, about 20 mils or about 25 mils thick, formed of a polyester, polycarbonate or similar material. In the embodiment of the keypad 60 illustrated in FIG. 4a, the polycarbonate member 64 is embossed to form the plurality of keys 62 thereon in the desired arrangement. The overlay keys 62 are raised, for example by an embossing process, slightly above the surface of the member 64, for example by about 15 mils, about 20 mils or about 25 mils, to facilitate location of the keys 62 by a vision-impaired person. To ensure good contact with the touch screen 20 when the keys 62 are depressed, a contact button 66 may be provided on the lower surface of each of the embossed keys 62. The contact buttons 66 extend slightly beneath, for example from 35 to about 45 mils, the lower surface of the member 64. Advantageously, the contact buttons 66 may comprise dome-shaped protrusions formed of a urethane material. Further, raised rims 68, for example about 10 mils to about 100 mils high, may be provided on the upper surface of the member 64 about each key of the plurality of keys 64 to further facilitate location of the keys by a vision-impaired person. The member 62 may also be embossed with indicia, advantageously Braille indicia, in the vicinity of all keys, selected individual keys or a set or subset of selected keys, for example function keys, to facilitate the identification of specific keys by vision-impaired persons and dexterity challenged.

Figure 5:
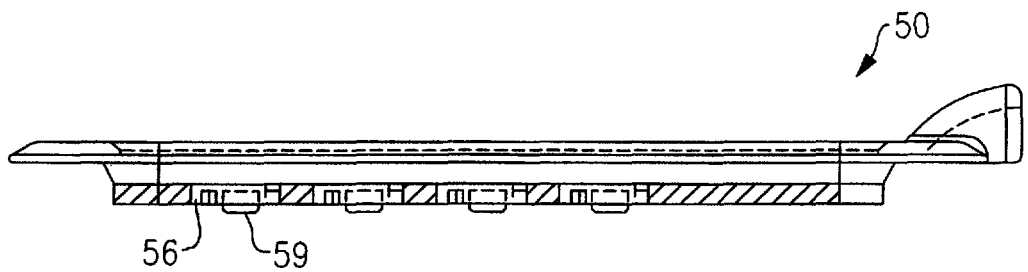
FIG. 5 is a sectional elevation view of an embodiment of the insert taken along line 5-5 of FIG. 2.

Referring now to FIGS. 2 and 5, the overlay keypad 160 does not include any contact buttons. Rather, in this embodiment of the invention, contact buttons 58 are located within each of the discrete openings 56 and hinged to the wall of the insert 50 surrounding the discrete opening. Advantageously, the contact buttons 58 are formed integral with the insert 50 and connected to the surrounding wall via a spring arm 57 also formed integral with the insert 50. When a corresponding key 62 on the pad 160 is depressed, the contact button 58 disposed therebeneath will be displaced downwardly to contact a corresponding virtual button on the touch screen 20. To ensure good contact with the touch screen 20 when the keys 62 are depressed, a protrusion 59 may be provided on the lower surface of each of the contact buttons 58. The protrusions 59 may extend slightly beneath, for example about 10 mils to about 60 mils, the lower surface of the contact button 58. More generally, the protrusions must have a spaced relationship to the touch screen sufficient to be spaced from the touch screen when the corresponding key is not depressed, while activating the touch screen when the corresponding key is depressed. Advantageously, the protrusions 59 may comprise protrusions formed of a urethane material and may be disk-shaped or dome-shaped.

Referring now to FIG. 6, a transaction terminal 110 is depicted therein adapted in accord with the present invention to further facilitate use by dextrally-impaired persons. In this embodiment, an insert 150 is positioned over the touch screen 20 and supported by the housing 112 of the terminal 110. The insert 150 comprises generally planar member having a plurality of discrete openings 156 formed therein. As in other embodiments described herein, the plurality of discrete openings 156 may be arranged in any desired pattern that complements the virtual button arrangement that will be displayed on the touch screen for the particular transaction to be carried out via the transaction terminal. When insert in the recess 30 in the housing 112, the lower surface of the insert 150 must be spaced from and not contact the touch screen 20.

Figure 7:
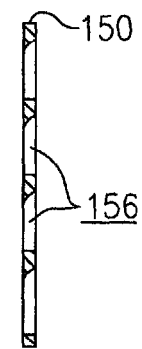
FIG. 7 is a sectional elevation view of the embodiment of the insert shown in FIG. 6.

Referring now to FIG. 7, each of the discrete openings 156 formed in the insert 150 are adapted to conform at the upper end to the tip of a human finger. For example, the insert 150 may be molded, such as for example from a polycarbonate material, with the upper portion of each of the plurality of discrete openings appropriately contoured to receive a human finger tip. When inserted within a discrete opening 156 so contoured, the base of the human finger tip will contact the selected virtual key on the virtual display on the touch screen 20 disposed beneath the insert 150. The contour conforming to the human finger tip provided on the discrete openings 156 guides the finger tip to the touch screen and enables the touch screen 20 to be activated with less depression force than associated with the depression of keys. In this manner, use of the touch screen by dexterity-challenged persons is facilitated. Further, to facilitate use by vision-impaired persons, the insert 150 may include indicia 70, for example Braille indicia, on the upper surface of the insert in association with each of the plurality of discrete openings 156, selected individual keys or a set or subset of the discrete openings 156, for example those keys for designated functions as herein before mentioned.

If desired, the transaction terminal 10 may be provided with feedback to the user indicating when a depressed key has successfully contacted a virtual button on the virtual display on the touch screen 20. For example, a click switch may be provided in operative association with each of the keys 62 and 262, the click switch adapted to produce an audible sound whenever a key has been depressed sufficiently to contact the corresponding virtual button beneath the key, thereby producing an audible feedback to a vision-impaired user. As a further example, a tactile switch may be built into each of the keys 62 and 262, the tactile switch adapted to produce a tactile sensation that would be sensed by the finger tip of the user whenever a key has been depressed sufficiently to contact the corresponding virtual button beneath the key, thereby producing a tactile feedback to a hearing-impaired or vision-impaired user.

Figure 9:
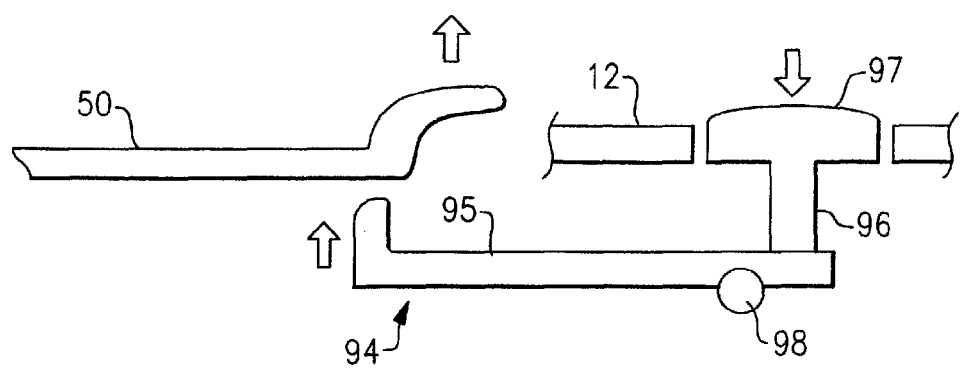
FIG. 9 is a sectioned elevation view of an embodiment of a release mechanism.

The transaction terminal 10 may be provided with a mechanism for facilitating the removable of the insert 50 from the recess 30 in the housing 12. Referring now to FIG. 9, the release mechanism 94 comprises a rocker arm 95 cantilevered generally perpendicularly outwardly from the base end of an upright push rod 96 having a head 97 at the upper end thereof. The rocker arm pivots on an axle rod 98 suitably mounted to the housing 12 for rotation about its axis. The head 97 is disposed in an access opening 99 in the housing 12. To release the insert 50, the user pushes down on the head 97 of the push rod 96, thereby causing the rocker arm 95 to pivot upwardly to contact the underside of the insert 50 and causing a side of the insert 50 to raise above the surrounding housing to facilitate the user gripping the insert 50 for removal from the recess 30. The insert 50 may be clamped in the recess 30 by means of small detents or spring surfaces that protrude from periphery of the wall framing the recess.

The transaction terminal 10 may also include a switch element 48 having at least having at least two switch states, including a first switching state when said insert is operationally engaged with the touch screen region of the touch screen and a second switching state when the insert is not operationally engaged with the touch screen. Further, in each switching state, the switch element may be adapted to activate a corresponding virtual display on the touch screen 20.

For purposes of this application, "operationally engaged" refers to the insert being engaged with the display screen such that depressing keys or similar indicia on the insert will activate the appropriate corresponding region of the touch screen. As a simple example, if a numeric keypad insert is placed on the transaction terminal such that pressing any number on the insert causes contact with that portion of the touch sensitive screen that causes the transaction terminal to register input of that same number, the insert is operationally engaged with the display screen. Conversely, if the insert has been lifted off, or levered away from, the touch screen such that pressing a number no longer invokes the corresponding portion of the touch screen, the insert is no longer operationally engaged with the display screen.

A system block diagram illustrating various internal components of transaction terminal 10 as well as components of a system in which the transaction terminal may be incorporated is described with reference to FIG. 10. Transaction terminal 10 includes a control circuit 100 which receives various inputs and controls various outputs. Control circuit 100 in the embodiment of FIG. 10 includes a central processing unit or "CPU" 104 and controller unit 106 which may include such elements as an interrupt controller, a memory controller and a direct memory access controller. Control circuit 100 may be provided on a microprocessor integrated circuit (IC) chip 115.

Control circuit 100 is in communication with a system memory 114 which includes such elements as RAM 118, EPROM 116 and FLASH memory 120. EPROM 116 stores various application programs which are executed by control circuit 102. In some operating modes programmed control circuit 100 displays PIN entry screens on touch screen 20 prompting store customers to enter PIN information. In the embodiment described with reference to FIG. 6, control circuit 100 displays on touch screen 20 virtual PIN pad buttons which enhance operation of insert 150. In other operating modes, control circuit 100 may display on touch screen 20 a signature entry screen, for example in opening 87 shown in FIG. 8, that prompts store customers to enter signatures on touch screen 20. EPROM 116 further stores an operating system which is loaded onto RAM 118 on system start up and largely determines the types of application programs that transaction terminal 10 is capable of running. System memory 114 and control circuit 100 may be in communication via system bus 122.

In one embodiment, EPROM 116 stores the WINDOWS CE (WINCE) operating system available from Microsoft, Inc. WINCE and other operating systems support browser programs enabling web pages (e.g., in HTML or XML) stored in local or remote servers to be viewed on touch screen 20.

Referring to further aspects of transaction terminal 10, transaction terminal 10 includes card reader unit 130 which presents data to control circuit 100. Card reader unit 130, together with a part of housing 12 forms card reader 15. Card reader unit 130 facilitates the reading of information from financial transaction cards (e.g., credit or debit) or other types of cards (EBT, customer loyalty). The information presented from card reader unit 130 to control circuit 100 may include (e.g., an account number, or customer ID number). Card reader unit 130 includes a signal detection unit 132 which picks up an electrical signal corresponding to information encoded on a card 135. Signal detection unit 132 may include a magnetic stripe read head where card 135 is a mag stripe card and/or a set of electrical contacts for reading information from card 135 where card 135 is an integrated circuit card, otherwise referred to as a "smart card." Card reader unit 130 further includes a decode circuit 134 which processes the signal produced by signal detection unit 132 and produces a decoded output (i.e., an account number, a customer ID number).

Referring to further aspects of terminal 10, the terminal includes, as discussed previously, a touch screen 20. Touch screen 20 includes display 136 and touch panel 138. In accordance with applications of transaction terminal 10, 110, control circuit 100 displays various information on touch screen 20 such as information messages, and prompts for information input such as PIN entry prompts and signature entry screens. Control circuit 100 also monitors and records signals from panel 138. By processing signals received from panel 138 control circuit 102 monitors and may record (x, y) coordinate values indicating the location of touch panel 138 that has been contacted by a finger or a stylus.

Referring to further aspects of transaction terminal 10, control circuit 100 may control and receive data from RFD reader unit 140. When activated, RFID reader unit 140 broadcasts a radio signal in attempt to activate RFID tags in a vicinity of transaction terminal 10. If a tag is activated in response, the tag sends a radio signal to RFID unit 140 which decodes the signal and presents a decoded output message to control circuit 100 corresponding to an encoded message of the tag. RFID tags carry identifying information and are typically placed on such objects as products for sale at a retail store and identification cards.

Control circuit 100 may control and receive data from bar code reading unit 155. When activated, bar code reader unit 155 captures image data containing a representation of a bar code symbol, decodes a decoded out message and presents the decoded out message to control circuit 100.

Transaction terminal 10 further includes various communication interface devices. In the embodiment shown, transaction terminal 10 includes a USB serial interface 160 and a radio transceiver block 162 such as may be provided by one or more of an 802.11 radio transceiver and a Bluetooth radio transceiver. Through one or more of the communication interfaces, transaction terminal 10 communicates with a larger store network 170. Store network elements in the embodiment shown include a cash register 174 which, like transaction terminal 10, may be at the point of sale 175, and a store server 176 which, among a variety of functions, may store a price lookup table (PLU) so that store server 176 may return to the point of sale 175 a price of an item in response to receipt from the point of sale a UPC decoded out message. Store network 170 may further include an access point 177 enabling communication between radio 162 and backbone 178. Access points 177 are particularly prevalent in networks which support communications in accordance with the IEEE 802.11 standard. As shown in FIG. 10, network 170 may include numerous transaction terminals as described herein including point of sale transaction terminals that are typically coupled to backbone 178 through cash register 174. Network 170 may also include several stand alone transaction terminals as indicated at 179.

In addition to being deployed at a point of sale for use in assisting purchase transactions, a transaction terminal 10, 110 as described herein may be utilized in other customer assistance applications in combinations with or independent of purchase transaction applications. For example, transaction terminal 10 may be deployed as a price verifier. Transaction terminal 10, 110 may also be utilized as an information kiosk, which informs a customer e.g., as to the availability of items for purchase or the location of items in a store.

A parts list summarizing component part model numbers of transaction terminal 10 is summarized in Table 1.

TABLE 1

| Component Part | Model No. |
| --- | --- |
| Processor IC Chip 110 | Intel GDS-1110-BD |
| Card Reader Unit 130 | Panasonic ZU-9A36BE1 |
| Display 136 | NANYA LCBFB-161-18 |
| Touch Panel 138 | FUJITSU N010-0554-T0001 |
| EPROM 116 | INTEL E28F320J3A-110 |
| RAM 118 | MICRON MT48LC4M16A2TG-75L-TR |
| FLASH 120 | INTEL TE28F320J3C-110 |
| Radio 162 | TAIYO YUDEN EYSF2CAVX |
| Bar Code Reader Unit 150 | Hand Held Products, Inc. IT4X10/80 OEM Miniature Image Engine With MOTOROLA MC938MXLVH15 Processor |

Referring to further aspects of the larger system in which transaction terminal 10 may operate, store server 176 may, through an appropriately configured gateway 184 and publicly accessible network 186, (e.g., the Internet) be in communication through gateway 189 with a remote sever 188 which may store web pages that may be displayed on display 136. Store server 176 is also in communication through a suitable gateway 190 with a credit/debit authorization network 192. In response to an authorization request that includes a customer account number and a purchase amount credit/debit authorization network through gateway 190 may, in one embodiment, either decline a requested purchase transaction or approve a requested purchase transaction. When credit/debit authorization network approves a transaction, credit card company accounts, retailer accounts, and customer accounts are appropriately credited or debited. Network 192 reports to server 176 the result of the transaction request and the request record is appropriately processed (e.g., as part of the processing server 176 may instruct transaction terminal 10 to appropriately display an APPROVED or DECLINED message on touch screen 20).

The control circuit 100 associated with the transaction terminal may be provided with software that causes an audible sound to be generated whenever a virtual button on the virtual display on the touch screen 20 has been properly contacted, thereby producing an audible feedback to a vision-impaired user. The control circuit 110 associated with the transaction terminal could be provided with software that causes the display screen beneath the touch screen to light through a translucent view port or an opening 90, illustrated in FIG. 8, whenever a virtual button on the virtual display on the touch screen 20 has been properly contacted. A user, such as a hearing-impaired person, could see the illumination through the view port or opening 90 formed in the insert 50, such as for example the translucent view port 90 formed in the lower right-hand corner of the insert 50 shown in FIG. 8. Similarly, a separate indicator may be provided in operative association with the terminal 10 for the purpose of verifying to the user that the touch screen has indeed been activated.

The control circuit associated with the transaction terminal may also be programmed with software to recognize the functional nature of the particular insert 50 positioned over the touch screen 20 and, in response to the recognition of the functional nature of that particular insert, cause the virtual buttons displayed on the touch screen 20 to conform to the arrangement of the plurality of discrete openings in that particular insert 50. In this manner, the attendant overseeing the point-of-sale transaction would not need to act to change the virtual display on the touch screen 20 for a vision-impaired, hearing-impaired or dextrally-impaired person to customize the virtual display on the touch screen 20 to the particular insert 50 appropriate for that user.

Each of the embodiments of the transaction terminal 10 described and illustrated herein include a touch screen disposed within a recess 30 formed in the terminal housing 12. It is to be understood that present invention is not limited in application to such terminals, but may be adapted by those skilled in the art for application to terminals having touch screens mounted flush with the terminal housing. For use in connection with flush-mounted touch screens, the attachment and mounting aspects of the adaptor would be modified such that the adaptor would be supported on the housing when positioned in operational engagement with the touch screen with its deck over and in spaced relationship with the touch screen.

While the key template of the insert may match the native key template of the display screen, it may be necessary or desirable to reconfigure the response of the touch screen based upon whether an insert is present, and even based upon which insert is present—in other words, the insert may present a simple binary, on-or-off configuration choice, or multiple configurations may be possible depending on which of a number of different inserts is in place. While an operator may implement the necessary software reconfiguration manually, as by pressing one or more keys on an associated register, it would be desirable to have a sensing or detecting element which, in effect, enables the system to know whether an insert is in place on the transaction terminal and, where multiple inserts are provided, which specific insert is in place. This element may take any suitable form, such as, for example, a switch in the body of the transaction terminal which is engaged by an element on the insert when the insert is operatively engaged with the display screen. A simple example would be a contact switch which is activated by a projection on the insert when the insert is placed on the display screen. For example, as shown in FIG. 1, a mechanical switch 48 may be mounted on a part housing 12 lying beneath the flange 54 of the insert 50. When the insert 50 is operatively engaged with the touch screen, the flange 54 would depress the switch 48 causing the switch to move to a first switching state. When the switch is not activated the touch screen terminal would have a first response profile, and while the switch was activated the touch screen would have a second response profile. For example, assume that for a sighted user the key indicia for the touch screen were fully distributed over the entire touch screen, but when an insert for visually impaired user was in place, it was considered desirable to shift or cluster the keys into a more central position, giving the user's finger's some edge clearance for reference and better navigation. As long as the insert was removed the first, fully distributed configuration would be in place, but upon engaging the insert, activation of the contact switch would cause a software reconfiguration shifting the keys into a more centralized relationship. Multiple configurations could be accommodated in a number of ways, such a by providing a plurality of switches in different locations around the periphery of the display screen, and providing each type of insert with an element corresponding to the appropriate switch and engageable with only that switch when the insert was placed in operational engagement. Any suitable switching or detecting means may be used, include magnetic switches.

Although the invention has been described herein with reference to the point-of-sale transaction terminals 10, 110 depicted various embodiments illustrated in the drawings and herein described, it is to be understood that the invention is not limited in application to the particular embodiments of transaction terminals depicted and described herein. Those skilled in the art will understand that the teachings of the invention may be readily applied to other embodiments of transaction terminals without departing from the spirit and scope of the following claims.

What is claimed is:

1. A transaction terminal comprising:
    a terminal housing having a touch screen disposed within a recess in said terminal housing; and
    an adaptor for guiding vision-impaired persons in use of said touch screen, said adaptor including:
    an insert having a recessed deck defined by a flange that extends upwardly and outwardly from a perimeter of said recessed deck, said insert supported on said terminal housing with said recessed deck disposed over and in spaced relationship to said touch screen, said deck having at least one discrete opening therethrough, and
    a keypad associated with said insert, said keypad having at least one key juxtaposed relative to said least one discrete opening in said deck of said insert, said at least one key adapted upon depression to contact a selected portion of said touch screen region of said display screen.

2. A transaction terminal as recited in claim 1 wherein said keypad comprises an overlay pad disposed superadjacent said deck of said insert, said overlay pad having an observe surface marked with a raised indicia indicating a depress zone over said at least one discrete opening in said deck of said insert.

3. A transaction terminal as recited in claim 2 wherein said overlay pad is adhesively mounted to an upper surface of said deck of said insert.

4. A transaction terminal as recited in claim 1 wherein said at least one key of said keypad includes a dome-shaped contact on a lower surface of the keypad.

5. A transaction terminal as recited in claim 1 wherein said keypad comprises an underlay pad disposed subadjacent said deck of said insert, said underlay pad having a raised key extending upwardly into said at least one discrete opening in said deck of said insert.

6. A transaction terminal as recited in claim 5 wherein said underlay pad is adhesively mounted to a lower surface of said deck of said insert.

7. A transaction terminal as recited in claim 1 wherein said deck of said insert has a plurality of discrete openings therethrough and said keypad has a plurality of keys having a one-to-one correspondence with the plurality of discrete openings in said deck of said insert.

8. A transaction terminal as recited in claim 1 wherein insert includes a flanged portion extending outwardly from said deck of said insert for supporting said insert atop said housing.

9. A transaction terminal as recited in claim 1 further comprising a raised indicia associated with at least one of said at least one opening through said deck of said insert and said at least one key of said keypad, said indicia identifying a specific depress zone.

10. A transaction terminal as recited in claim 9 wherein said indicia comprises a Braille indicia.

11. A transaction terminal as recited in claim 1 further comprising an opening positioned over a portion of said touch screen said opening not associated with any of said plurality of keys.

12. A transaction terminal as recited in claim 1 further comprising a switch element with at least two switching states, including a first switching state when said insert is operationally engaged with said touch screen and a second switching state when said insert is not operationally engaged with said touch screen region of said display screen, each switching state activating a corresponding virtual display on said touch screen.

13. A transaction terminal comprising:
a terminal housing having a touch screen disposed within a recess in said terminal housing; and
an adaptor for guiding vision-impaired persons in use of said touch screen, said adaptor including:
an insert having a recessed deck defined by a flange that extends upwardly and outwardly from a perimeter of said recessed deck, said insert supported on said terminal housing with said recessed deck disposed over and in spaced relationship to said touch screen, said deck having at least one discrete opening therethrough, and
a depressible contact disposed in juxtaposition with said at least one discrete opening in said insert, said depressible contact adapted to move under a depression force into contact said selected portion of said touch screen.

14. A transaction terminal as recited in claim 13 wherein said depressible contact comprises a contact button disposed within said at least one discrete opening connected by a spring arm to a portion of said deck bounding said at least one discrete opening through said deck of said insert.

15. A transaction terminal as recited in claim 13 further comprising a keypad associated with said insert, said keypad having at least one key juxtaposed relative to said least one discrete opening in said deck of said insert, said at least one key supported on said depressible contact.

16. A transaction terminal as recited in claim 15 further comprising an overlay panel disposed atop said insert, said overlay panel having an observe surface marked with a raised indicia identifying a specific depress zone associated with said at least one discrete opening in said insert.

17. A transaction terminal as recited in claim 16 wherein said indicia comprises a Braille indicia 18. A transaction terminal comprising:
a terminal housing having a touch screen disposed within a recess in said terminal housing; and
an insert having a deck defined by a flange that extends upwardly and outwardly from a perimeter of said deck, said insert supported on said housing with said deck disposed in operative engagement with said touch screen, said deck having at least one discrete opening therethrough providing access to a selected portion of said touch screen, said at least one discrete opening in said deck including a concavely contoured recess, said recess generally conforming to a human finger tip.

19. An insert for use in connection with a transaction terminal having a touch screen region, said insert comprising a recessed deck adapted to be supported on the terminal over the touch screen said recessed deck being defined by a flange that extends upwardly and outwardly from a perimeter of said recessed deck, said recessed deck having at least one discrete opening therethrough through which a user may touch a selected portion of the touch screen.

20. An insert as recited in claim 19 wherein said at least one discrete opening in said deck of said insert includes a concavely contoured recess, said recess generally conforming to a human finger tip.

21. An insert as recited in claim 19 further comprising a raised rim extending upwardly from said deck, said raised rim extending about the periphery of said at least one discrete opening through said deck.

22. An insert as recited in claim 19 further comprising a indicia identifying a specific depress zone associated with said at least one discrete opening in said insert.

23. An insert as recited in claim 22 wherein said indicia comprises Braille indicia.

24. The insert of claim 19, wherein the insert is adapted so that movement of the flange of the insert results in movement of the recessed deck of the insert.

25. An adaptor assembly for adapting a display screen having a touch screen for use by the vision-impaired, said touch screen surrounded by a raised frame, said adaptor comprising:
an insert having a recessed deck defined by a flange that extends upwardly and outwardly from a perimeter of said recessed deck, said insert adapted to be supported by the raised frame surrounding said touch screen with said recessed deck disposed over the touch screen region of said touch screen, said recessed deck having a plurality of discrete openings therethrough providing access to selected portions of said touch screen;
an overlay disposed atop said recessed deck, said overlay having a plurality of keys displayed on an observe side thereof, said plurality of keys having a one-to-one correspondence with said plurality of discrete openings through said recessed deck, one key being juxtaposed over each of said plurality of discrete openings through said recessed deck.

26. An assembly as recited in claim 25 wherein said insert includes a plurality of depressible contact buttons, said plurality of contact buttons having a one-to-one correspondence with said plurality of discrete openings through said deck, one contact button within each of said plurality of discrete openings, each of said plurality of contact buttons connected by a spring arm to a portion of said deck bounding the respective discrete opening through said deck in which said respective contact button is disposed.

27. An assembly as recited in claim 26 wherein each of said plurality of contact buttons has a dome-shaped portion on a lower surface thereof.

28. An assembly as recited in claim 25 wherein said overlay comprises an embossed member having an upper observe side and a lower reverse side, said plurality of keys being embossed therein on the observe side of said member.

29. An assembly as recited in claim 28 wherein each of said overlay includes a plurality of dome-shaped contacts disposed on the lower reverse side of said member, said plurality of dome-shaped contacts having one-to-one correspondence with said plurality of keys, one dome-shaped contact being juxtaposed with a respective one of said plurality of keys.

30. A transaction terminal for use by vision-impaired persons and fully-sighted persons, comprising:
 a terminal housing having a touch screen, said touch screen operative to display a plurality of virtual buttons thereon, said virtual buttons being activated by touch;
 an adaptor for guiding vision-impaired persons in use of said touch screen, said adaptor having a deck defined by a flange that extends upwardly and outwardly from a perimeter of said deck, said deck having an upper surface, a lower surface, and a plurality of discrete openings therethrough, said adaptor being selectively positionable into a first position in which said adaptor is operatively positioned over and in a spaced relationship above said touch screen; and
 a release mechanism pivotally mounted to the housing, said release mechanism being selectively actionable to release said adaptor from disposition in the first position.

31. A transaction terminal as recited in claim 30, further comprising a switch element having at least having at least two switch states, including a first switching state when said insert is operationally engaged with the touch screen and a second switching state when the insert is not operationally engaged with the touch screen, the switch element is adapted to activate a corresponding virtual display on the touch screen.

* * * * *